United States Patent [19]

Sartor

[11] Patent Number: 5,135,056
[45] Date of Patent: Aug. 4, 1992

[54] PLOUGH APPARATUS

[76] Inventor: Giuseppe M. Sartor, P.O. Box 181, Bourke, N.S.W. 2840, Australia

[21] Appl. No.: 555,399
[22] PCT Filed: Jan. 31, 1989
[86] PCT No.: PCT/AU89/00032
§ 371 Date: Aug. 10, 1990
§ 102(e) Date: Aug. 10, 1990
[87] PCT Pub. No.: WO89/06897
PCT Pub. Date: Aug. 10, 1989

[30] Foreign Application Priority Data

Jan. 28, 1988 [AU] Australia ............... PI 6452

[51] Int. Cl.$^5$ ............... A01B 5/08; A01B 3/28
[52] U.S. Cl. ............... 172/221; 172/219; 172/289; 172/569
[58] Field of Search ............... 172/204, 219, 220, 221, 172/218, 569, 577, 584, 288, 289, 286, 291

[56] References Cited

U.S. PATENT DOCUMENTS

| 1,437,294 | 11/1922 | Dowdy et al. | 172/221 X |
| 1,529,042 | 3/1925 | Teasley et al. | |
| 2,055,632 | 9/1936 | Petty et al. | 172/289 |
| 2,441,466 | 5/1948 | Boren | 172/289 X |
| 2,491,556 | 12/1949 | Fulkerson | |
| 2,637,257 | 5/1953 | Betz | |
| 2,764,075 | 9/1956 | Fowler | 172/219 X |
| 2,834,274 | 5/1958 | Barrett, Jr. | 172/219 |
| 2,900,033 | 8/1959 | Coviello | 172/221 X |
| 2,973,045 | 2/1961 | Coviello | 172/212 |
| 3,186,496 | 6/1965 | Cox et al. | 172/219 X |
| 4,869,327 | 9/1989 | Korf | 172/219 X |
| 4,984,638 | 1/1991 | Coste | 172/221 |
| 5,000,267 | 3/1991 | Harrell | 172/219 |

FOREIGN PATENT DOCUMENTS

| 158576 | 2/1905 | Fed. Rep. of Germany . | |
| 912069 | 3/1982 | U.S.S.R. | 172/213 |
| 2002211A | 2/1979 | United Kingdom . | |

OTHER PUBLICATIONS

European Search Report.

Primary Examiner—Randolph A. Reese
Assistant Examiner—Jeffrey L. Thompson
Attorney, Agent, or Firm—Larson and Taylor

[57] ABSTRACT

Plough apparatus comprising a wheeled support structure (10) that supports a plough beam (20) that is pivotable in a horizontal plane about the center of the support structure between first and second plough beam positions. The plough beam (20) carries a plurality of plough discs (50) or reversible mould boards (100) that are rotatable about a vertical axis between first and second ploughing positions corresponding respectively with the plough beam positions so that the plough apparatus can produce right or left hand furrows as desired.

16 Claims, 7 Drawing Sheets

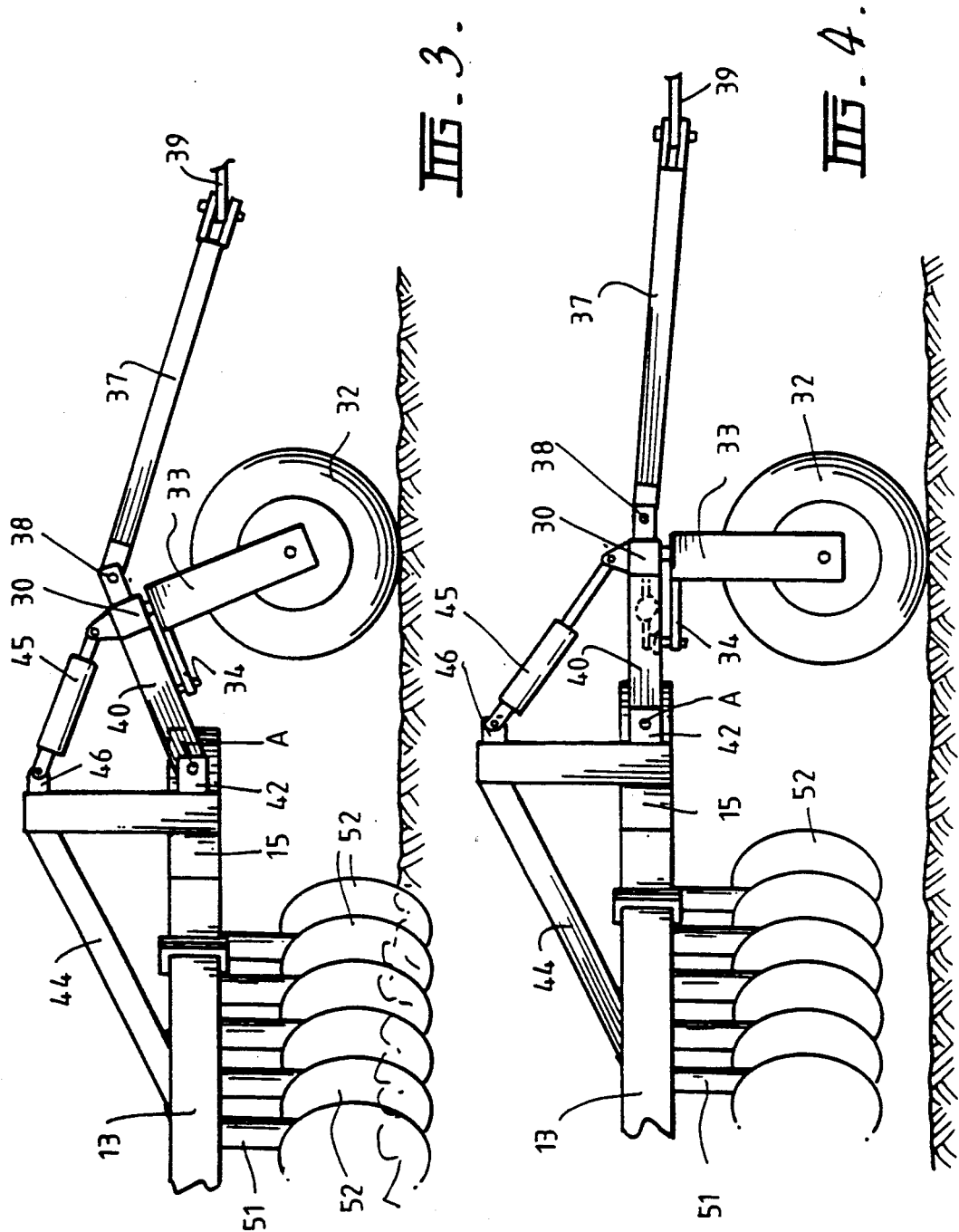

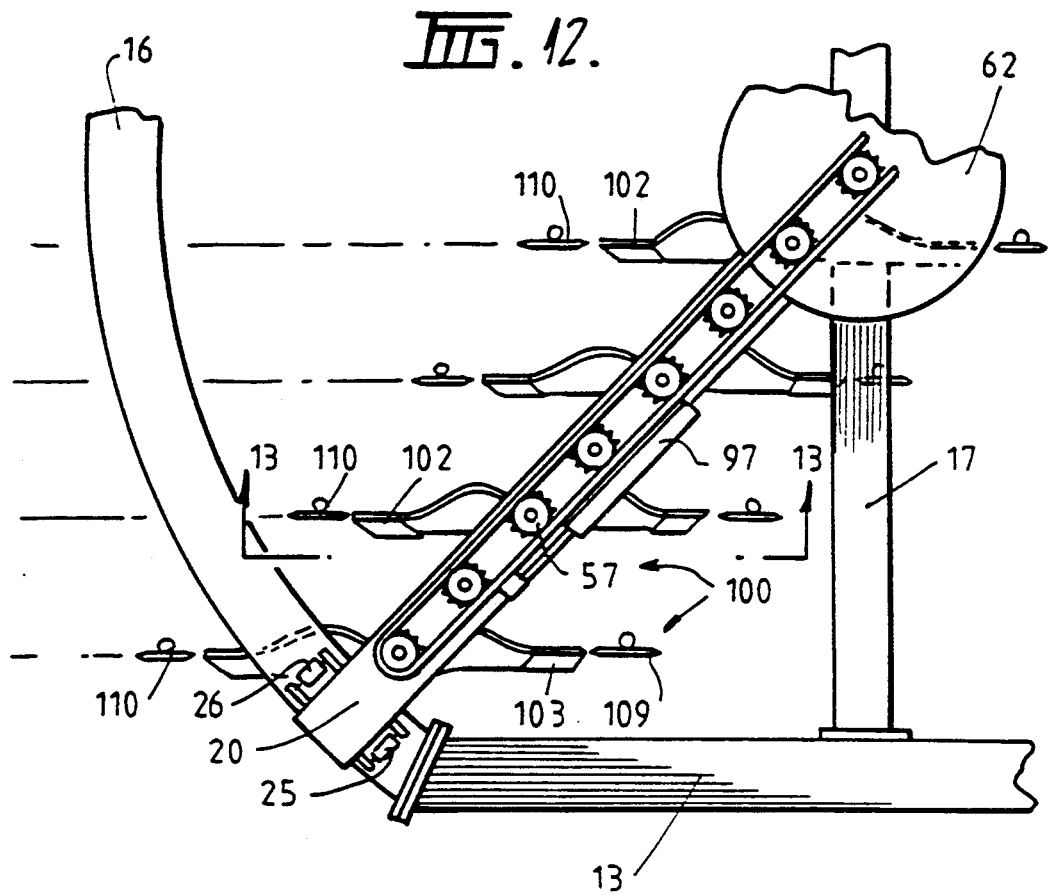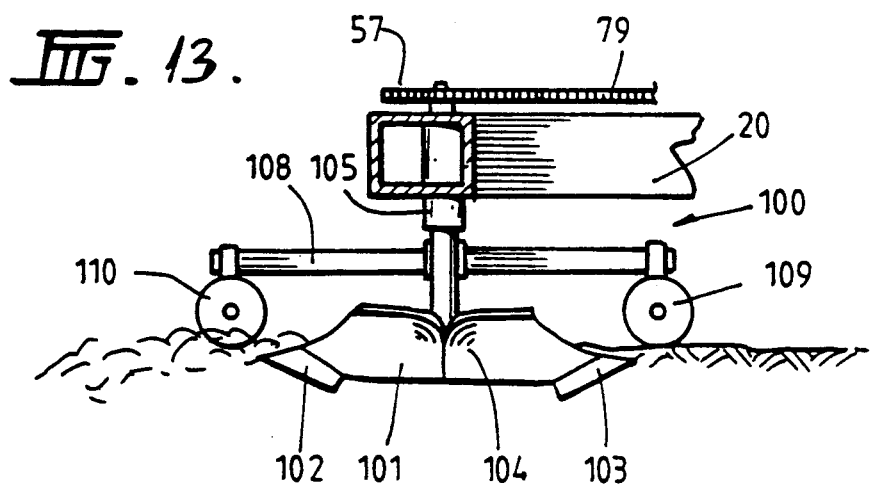

PLOUGH APPARATUS

FIELD OF THE INVENTION

This invention relates to ploughs of the general type comprising a longitudinal frame fitted with a gang of plough elements such as plough discs or mould-boards.

DISCUSSION OF PRIOR ART

This form of plough is a familiar and fundamental agricultural apparatus, and its general configuration is well known. The plough elements are fixed equidistantly apart across the plough's width so as to cut parallel furrows in the earth and to turn each resultant furrow-slice over, thus tilling a full band of a field with a single passage of the plough assembly.

A plough element may comprise either a dished plough disc, or a ploughshare and mould-board configuration. The disc combines the function of cutting through the soil and turning over the furrow-slice—the disc's rim cuts, and its concave face turns the soil. The disc is generally oriented between 10° and 25° from the forward direction of the plough, so that the concave face turns the furrow-slice adequately.

In the mould-board configuration, the ploughshare cuts through the soil, which is pushed against and is turned over by the concave mould-boards.

The single passage of a plough element through the soil leaves a furrow, and a mound on one side, consisting of the turned furrow-slice. The passage of a parallel gang of plough elements, each turning the soil in the same direction, will normally leave a ditch on one side of the ploughed band of soil, and a mound on the other side. Between the two sides, the soil turned by one plough element normally fills the furrow left by the adjacent plough element. The plough members are ranged in a line set at an angle of some 45° to 60° to the forward direction of travel of the plough, so as to ensure that the furrow-slices fill the adjacent furrows in the manner described. However, the fact that a ditch and a mound are left on either side of the plough's path may have undesirable consequences for a tilled field, depending on the path taken by the plough assembly.

If the field is ploughed in the conventional manner, essentially in an inwardly spiralling helical path, firstly around the field's perimeter, and thence gradually inward in a continuous path to the centre, then the field will be left with a mound of earth adjacent its perimeter, since the residual mound at the side of the plough is pushed outwardly by the plough's action. A residual ditch will also be left along the plough's path. An uneven surface results, with numerous disadvantages for agriculture, in particular making the field suitable for irrigation.

If the field is ploughed in a series of parallel strips, with the plough being turned 180° at the end of one run, and ploughing the earth directly adjacent the last strip, then the residual mound of the first run will be augmented by the residual mound of the second run, since the plough has turned 180° and yet the residual mound will be left on the same side of the plough. Similarly, deep residual furrows will be left between runs. Again, this leaves the field uneven, with a corresponding lower yield and unsuitability for irrigation.

To address this problem by running the plough in the same direction in a series of parallel paths is clearly uneconomic and time-wasting, since the plough must be returned to the same side of the field before commencing each run.

According to one existing attempt to resolve this problem, there is provided a double plough, with two offset gangs of plough elements, such that the first gang turns the earth in one direction, and the second gang subsequently turns it back. This avoids leaving a residual ditch and mound, and leaves an even ploughed surface. However, this approach necessarily requires double tillage of the soil, which has been found to be considerably less effective than single tillage. For instance, it is less effective in weed control since weeds are not left turned over with their roots exposed, but rather are turned back upright, with a greater chance of survival and further propagation.

Hence, there is a need for a single ganged multiple plough which can reverse the direction in which each plough element throws the soil in alternate passes. One such plough has already been developed, with two distinct gangs of plough elements, but with only one gang in operation at one time. The plough elements on one gang all throw earth to the left; the plough elements on the other gang throw to the right. The two gangs are mounted on the plough to allow one gang to be set in ploughing position and the other gang to be raised above it; the two gangs can then be reversed by mechano-hydraulic means. One pass of the field is made with the earth turned to the right, for example, of the plough; the gangs are then reversed as the plough is turned around at the top of its run; and the next pass of the plough can proceed adjacent to and in the opposite direction to the last. In this way, the residual ditch of one run may be filled and emptied by the residual mound of the next.

However, this is an expensive and mechanically cumbersome solution to the problem. The provision of two entirely distinct sets of plough elements is clearly wasteful, and the mechanical structure required to support one gang above the other, and to allow the gangs to reverse, is unnecessarily heavy and complex. Due to the complicated structure, and the need to elevate the unused gang, the plough is unstable, with a high centre of gravity, and is suitable only for a limited number of operative plough elements, generally between two and six. This is clearly unsuitable for medium- to large-scale agriculture, in which gangs of twelve or more plough elements are required. Moreover, it is difficult in this configuration to provide for extensive variation in the angle of the gang of plough elements, and the angle of the cutting portions, with respect to the plough's forward direction of travel.

The present invention accordingly was developed from the realization that the defects of the existing prior art may be addressed by a reversible, single-ganged plough suitable to carry multiple plough elements, dispensing with two substitute gangs.

SUMMARY OF THE INVENTION

According to the present invention there is provided a plough apparatus comprising a wheeled support structure comprising arcuate end beams; a plough beam mounted for pivotal movement about the centre of the support structure with opposite ends of the beam supported for movement along the arcuate end beams; and a plurality of rotatable plough elements spaced along the plough beam; wherein the plough beam is adapted to pivot in a horizontal plane between a first beam position and a second beam position; and wherein each plough element is adapted to be rotated about a vertical axis between a first ploughing position corresponding with the first beam position and a second ploughing position corresponding with a second beam position.

Preferably the support structure has a pair of spaced longitudinally extending side beams interconnecting the arcuate end beams and a reinforcing cross beam extends across the side beams and through the plough beam whilst allowing rotation of the plough beam between the first and second beam positions.

In a preferred embodiment each arcuate end beam is positioned within end flanges on the respective end of the plough beam so that the plough beam is supported at each end for rotation about the centre of the support structure and each end flange of the plough beam supports a roller which resiliently engages the adjacent surface of the arcuate end beam. Alternatively each end flange of the plough beam is a sliding fit on a bearing position between the end flange and the adjacent surface of the arcuate end beam.

In one embodiment each plough element comprises a plough disc mounted on a shaft supported by the plough beam to be axially rotatable and capable of axial linear displacement relative to the plough beam and a chain driven sprocket is attached to one end of each shaft to effect axial rotation of the shaft whereby movement of the chain effects rotation of all the disc assemblies.

Preferably the shaft of each plough element is capable of vertical displacement relative to the plough beam about a spring positioned co-axially around the shaft and compressible between a collar on the shaft and the underside of the plough beam.

In another embodiment each plough element comprises at least one mould board positioned on either side of a shaft mounted for axial rotation about the plough beam.

DESCRIPTION OF THE DRAWINGS

Various embodiments of the present invention will now be described by way of example only, with reference to the accompanying drawings, in which:

FIG. 3 is a side view taken on lines 3—3 of FIG. 2 of a wheel and steering mechanism;

FIG. 4 is a view similar to FIG. 3 but showing the assembly in an inoperative position;

FIG. 12 is a plan view illustrating the detail of a mould board plough; and

FIG. 13 is a cross-sectional view taken along the lines 13—13 of FIG. 12 illustrating the detail of a double mould board.

DESCRIPTION OF EMBODIMENTS

Figure 1:
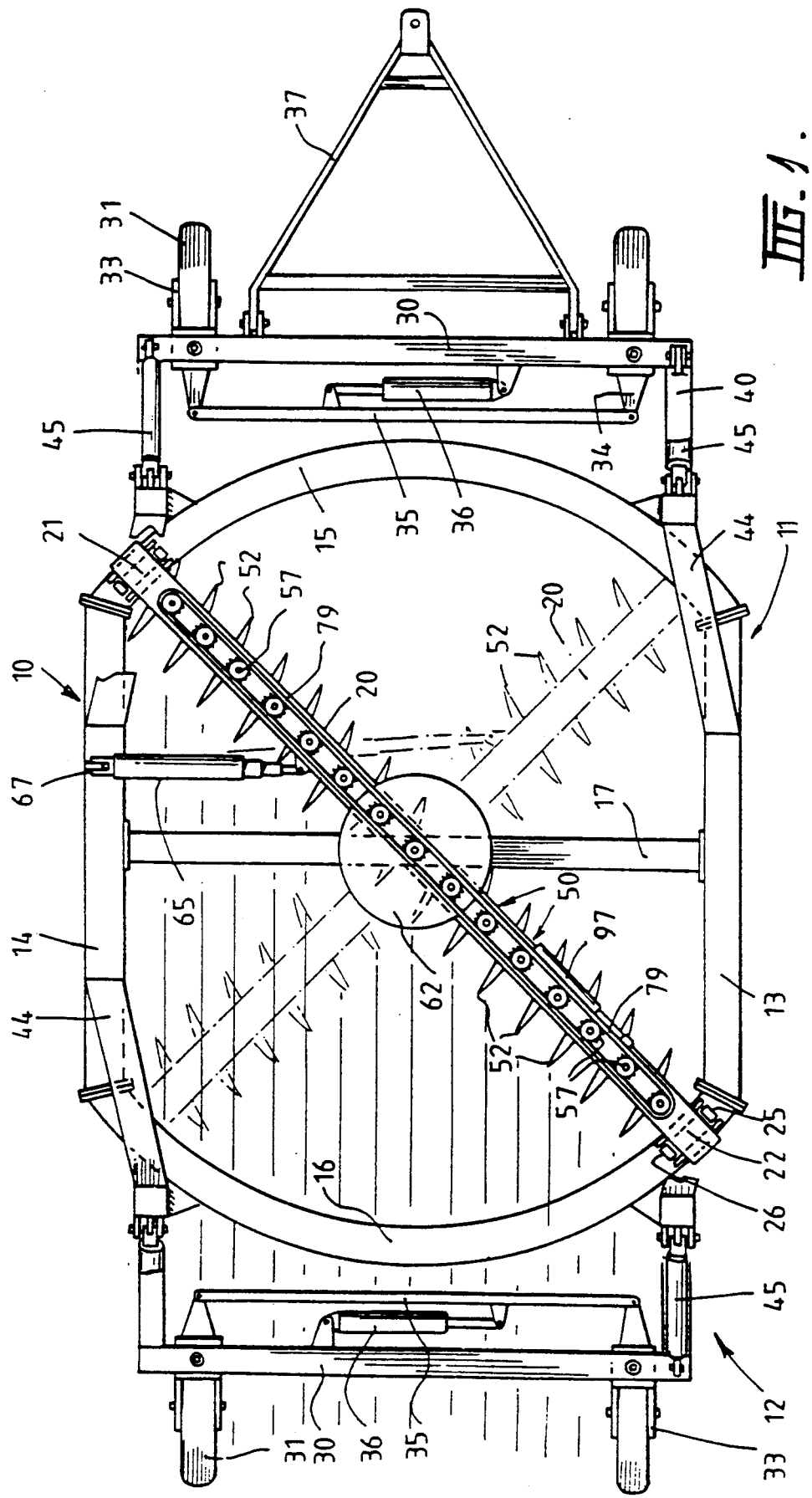
FIG. 1 is a plan view of a reversible disc plough.

The disc plough illustrated in FIGS. 1 to 10 of the accompanying drawings, in essence comprises a support structure 10 supported on front and rear bogey assemblies 11 and 12, the support structure 10 carrying a plough beam 20 that extends diagonally across the structure and is displaceable about the support structure through approximately 90° from one diagonal to another. The plough beam 20 carries a plurality of disc assemblies 50, each disc 52 being axially rotatable from one ploughing position when the plough beam 20 is in its first position to a second ploughing positioning when the plough beam 20 is displaced to extend across the opposite diagonal.

Figure 2:
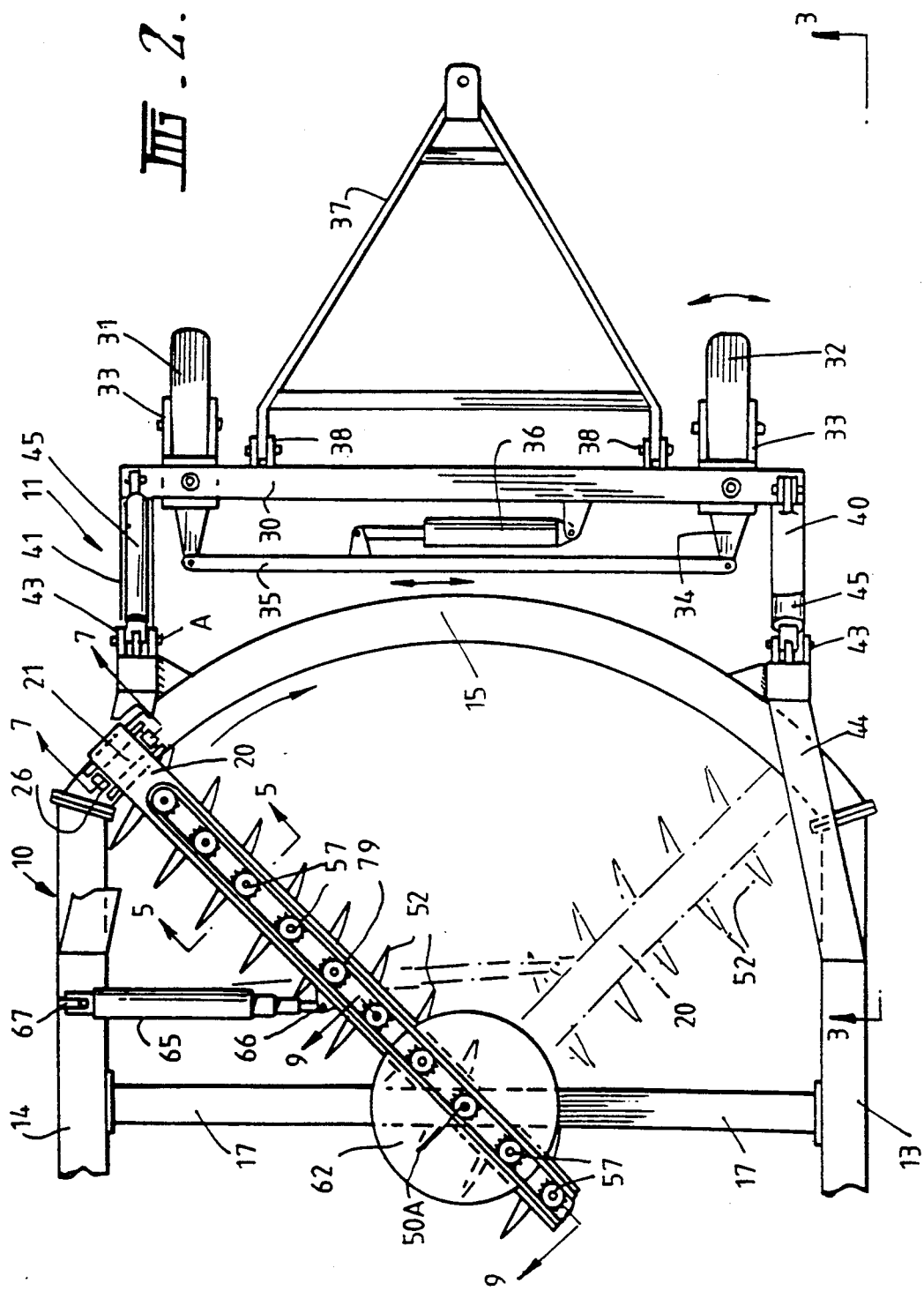
FIG. 2 is an enlarged plan view of the front of the plough.
Figures 5, 6:
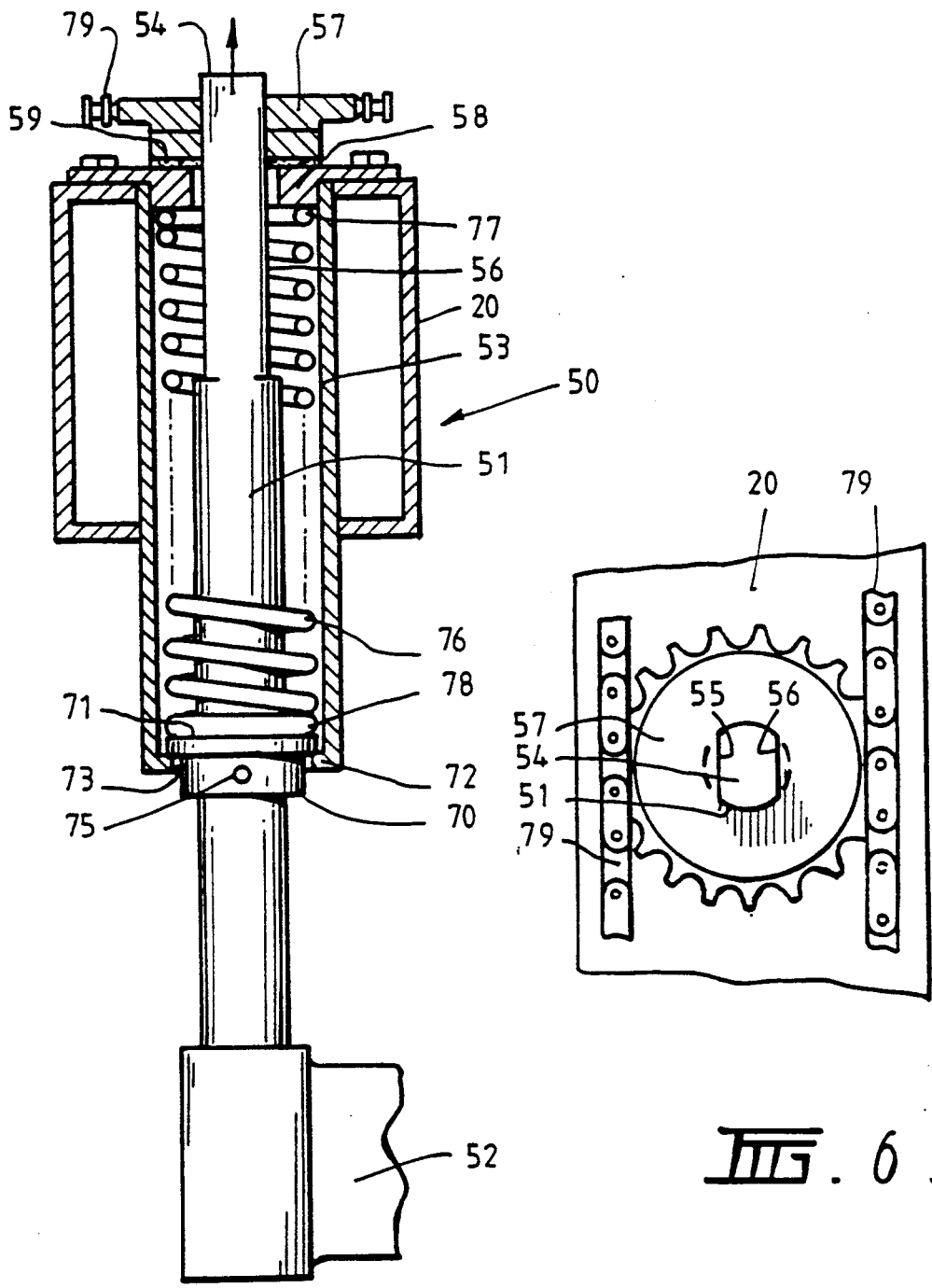
FIG. 5 is a cross-sectional view taken along the lines 5—5 of FIG. 2.
FIG. 6 is a plan view of the assembly shown in FIG. 5.

The support structure 10 comprises a pair of parallel spaced apart longitudinal beams 13 and 14 that operate as side supports joined, at each end by a respective arcuate forward support beam 15 and arcuate rearward support beam 16. The forward and rearward support beams 15 and 16 are bolted or welded to the longitudinal support beams 13 and 14 and all the beams are of rectangular cross-section. A lateral reinforcing beam 17 of square cross-section is bolted or welded to extend across the mid span between the longitudinal beams 13 and 14 of the support structure. The support structure is supported at the front and rear ends by similar bogey assemblies 11 and 12. As shown with particular reference to FIGS. 2 and 3 which illustrate the forward bogey assembly 11, a cross bar 30 supports at opposed ends thereof a pair of tire and wheel assemblies 31 and 32, each tire and wheel assembly 31, 32 is supported for axial rotation about a fork structure 33 that is mounted to the cross bar to allow rotation about a substantially vertical axis. A trailing arm 34 from the fork structure 33 is interconnected by a tie rod 35 that is, in turn, driven by a pneumatic or hydraulic cylinder 36 that is located between the cross bar 30 and the tie rod 35. Actuation of the cylinder 36 has the effect of causing the wheels 31, 32 to pivot about the vertical axis to effect steering as shown in FIG. 2. The cross bar 30 is coupled through a triangular frame 37 to a pivoting linkage 38 that, as shown in FIG. 3, can be attached to a draw bar 39 of a towing vehicle such as tractor. The cross bar 30 is attached to the support structure 10 by a pair of lateral support brackets 40, 41 that are pivotally secured to projecting flanges 42, 43 at the forward end of the support structure 10. A triangular reinforcing support 44 extends vertically upwardly from the end of each side of the support structure 10 and a hydraulic or pneumatic cylinder 45 is positioned between the upper end 46 of the support structure 44 and the end of the cross bar 30 on each side to cause pivotal movement of the lateral support brackets 40, 41 and thus the whole bogey assembly 11 relative to the support structure 10. In this manner by displacing the wheel structures downwardly, the support structure 10 is lifted as shown in FIG. 4 to an inoperative position. When the plough is in the operative position, the cylinders 45 are retracted causing the wheel assembly to pivot about the point A allowing the support structure 10 to move into an operative position as shown in FIG. 3. Although not described in detail, it is understood that the rear bogey assembly 12 operates in a similar manner. The cylinders 45 that operate the steering of both the front and rear bogey assemblies 11 and 12 are coupled to the controls of the tractor (not shown). The turning capacity of the bogey assemblies allows the plough to be manoeuvred in a crab-like fashion thus vastly improving the manoeuvrability of the apparatus allowing the plough to be used in very tight corners. In normal ploughing operations it is understood that the plough would follow the tractor without the necessity for using the independent front and rear steering facilities.

Figure 7:
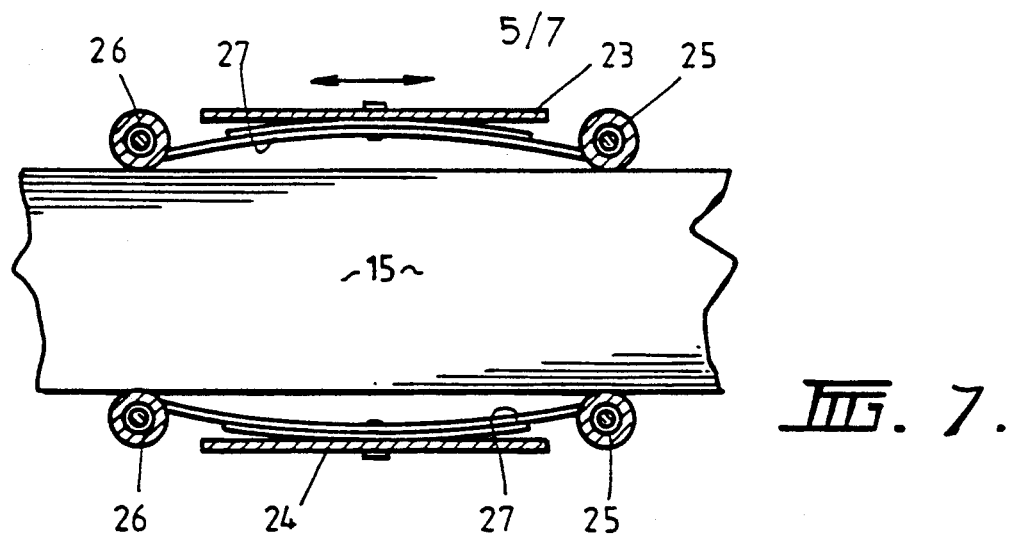
FIG. 7 is a cross-sectional view taken on the lines 7—7 of FIG. 2.
Figure 8:
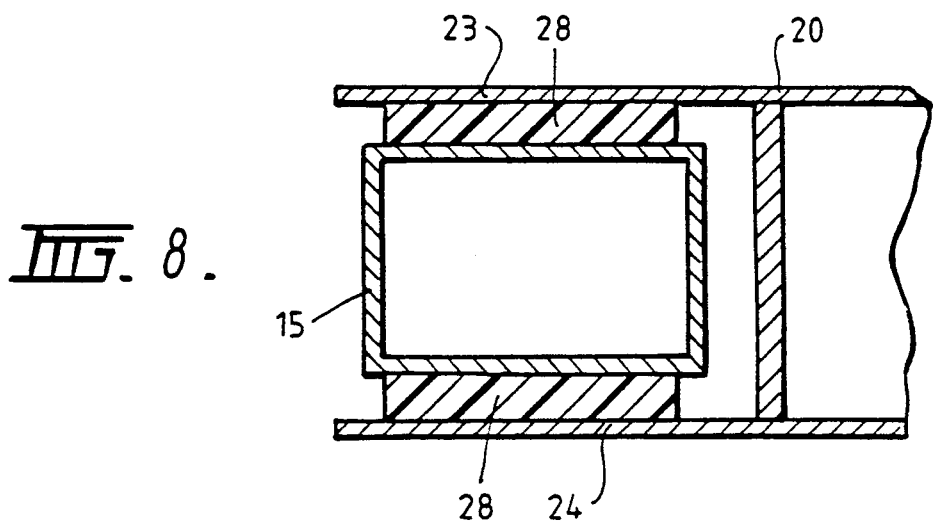
FIG. 8 is a similar section to FIG. 7 but showing an alternative arrangement.

The plough beam 20 which is of rectangular cross-section, is mounted onto the support structure 10 so that each end 21, 22 of the plough beam 20 extends above and below the arcuate support beams 15 and 16. In FIGS. 2 and 7 one means of supporting the plough beam 20 is illustrated, whereby the plough beam 20 terminates in a pair of vertically spaced end flanges 23, 24 with the arcuate support beam being positioned between the end flanges. Each end flange 23 or 24 carries a pair of rollers 25, 26 mounted to the end flanges by a spring lever 27 that urges the rollers into engagement with the adjacent surface of the support beam 15 or 16. Thus, each end of the plough beam 20 is in direct contact with both the upper and undersurface of the respective arcuate support beam. Each roller 25, 26 is mounted to be rotatable about an axis that extends radially of the arcuate curve of the end beam so that as the plough beam 20 moves from one diagonal to another, the rollers 25, 26 roll against the adjacent surfaces of the support beam thus providing a smooth running, yet positive engagement between the support beam and the plough beam. In an alternative arrangement shown in FIG. 8, the rollers with the spring beam are replaced by nylon bearings 28 of rectangular cross-section which extend between the overlapping end flanges 23, 24 of the plough beam 20 and the upper and lower surfaces of the arcuate support beam 15 or 16.

As mentioned earlier in the specification and with particular reference to FIG. 1, the plough beam 20 extends diagonally across the support structure 10 and the support structure 10 is also provided with a lateral reinforcing beam 17 that extends across the centre of the assembly. The lateral reinforcing beam 17 extends through a cut-out 60 provided in the centre of the plough beam 20 and the plough beam is reinforced by a pair of circular plates 61, 62 that are welded to the top and bottom surfaces of the plough beam to define a gusset with, as shown in FIG. 9, a rectangular aperture 63 through which the lateral reinforcing beam 17 extends.

Displacement of the plough beam 20 from the two operative positions as shown in FIG. 1 is effected by a pneumatic or hydraulic cylinder 65 that is mounted between a flange 66 secured to one side of the plough beam and a similar mounting point 67 on one of the longitudinal support beams 13 and 14. When the hydraulic or pneumatic cylinder 65 is actuated the plough beam 20 is forced from the position shown in full profile in FIG. 1 to the dotted profile in FIG. 1.

Figure 9:
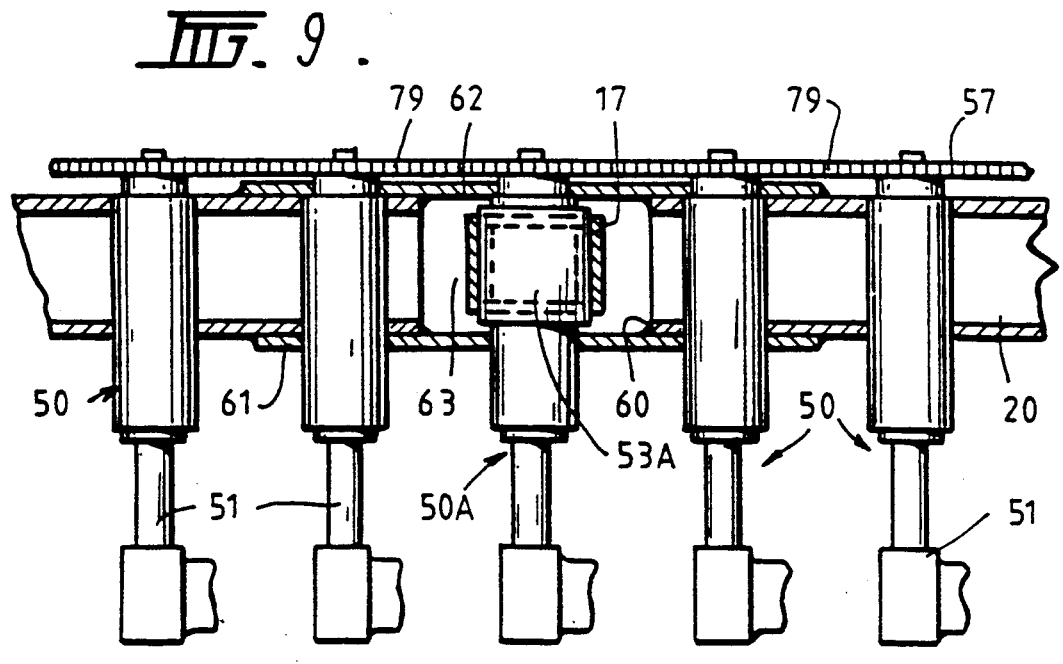
FIG. 9 is a cross-sectional view taken along the lines 9—9 of FIG. 2.

As shown with particular reference to FIGS. 1, 5, 6 and 9, the plough beam 20 supports a plurality of disc assemblies 50. In the embodiment described above the plough beam in fact, supports fifteen disc assemblies 50 though it is understood that the number of disc assemblies would vary depending on the size of the plough. Each disc assembly 50 comprises vertical shaft 51 that has secured to one end thereof a concave disc 52 of conventional construction. The shaft 51 is located to extend through a cylindrical housing 53 that is welded to extend through the centre of the cross-section of the plough beam 20. The free end 54 of the shaft is provided with parallel sides 55 and 56 that are located within a similarly profiled aperture centrally of the sprocket 57. An end cap 58 is located over the end 54 of the shaft and bolted to the top of the beam 20 to close off the housing 53. A suitable bearing 59 is provided between the underside of the sprocket 57 and the end cap 58. A collar 70 with an annular shoulder 71 is placed onto the shaft 51 with the shoulder 71 abutting the end wall 72 of an aperture 73 in the end of the housing 53 preventing escape of the collar from the housing. By tightening a set-screw 75 the collar can be firmly secured to the shaft 53 thus preventing downward release of the shaft 51 from the housing 53. A coil spring 76 is positioned around the shaft 51 within the housing 53 with opposite ends 77 and 78 in engagement with the underside of the end cap 58 and the shoulder 71 on the collar 70. The location of the shaft 51 through the sprocket 57 is such that rotation of the sprocket 57 is imparted to the shaft but vertical displacement of the shaft 51 caused by the disc 52 hitting an obstruction is possible against the spring 76. In this way, each disc assembly 50 has a "jump-stump" capability. As shown in FIG. 9, the disc assembly 50A at the centre point of the plough is of similar construction except that the housing 53A is arranged to extend within an aperture provided in the lateral reinforcing beam 17. As shown in FIG. 1, all the disc assemblies 50 terminate at the upper surface of the plough beam 20 in a sprocket 57 thus defining a plurality of equally spaced sprockets 57 that are interconnected by a chain 79 which is, in turn, driven by a hydraulic or pneumatic cylinder 97 so that as the plough beam 20 moves from one position to another, the chain 79 rotates the sprockets 57 to effect rotation of each disc 52 to the new ploughing position.

Figure 10:
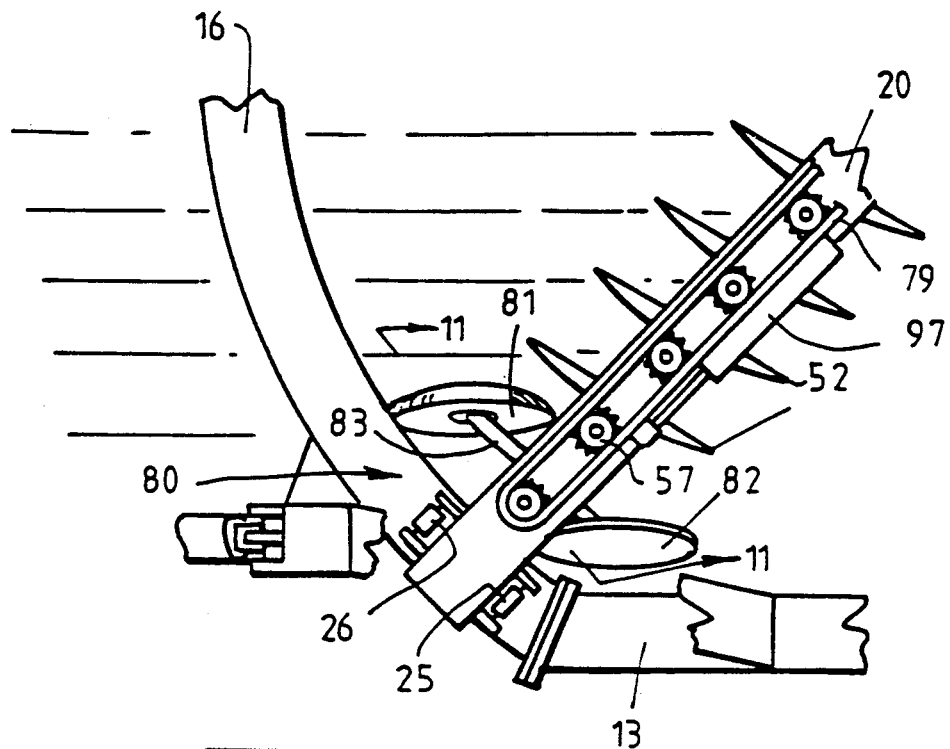
FIG. 10 is a detail view illustrating an alternative arrangement for the last disc of the plough.
Figure 11:
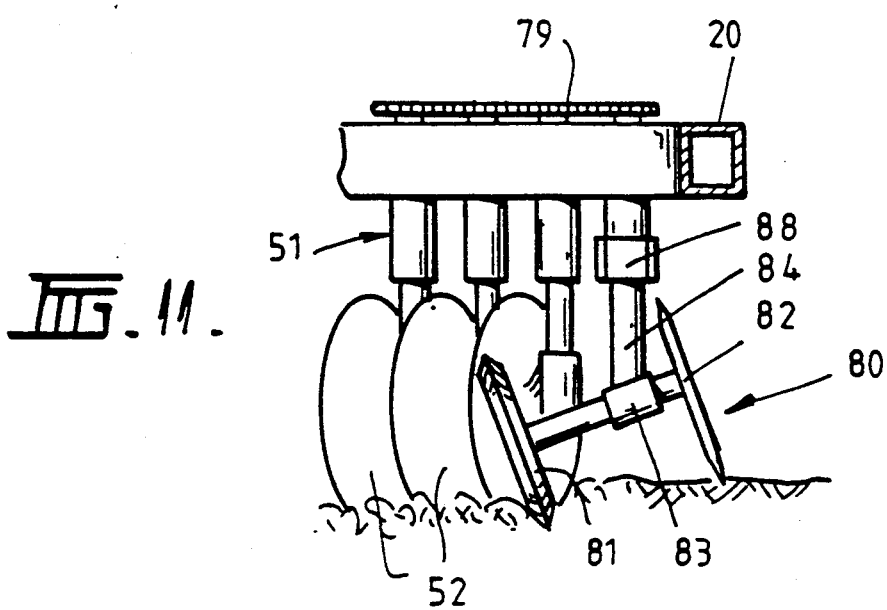
FIG. 11 is a cross-sectional view taken along the lines 11—11 of FIG. 10.

To assist the lateral stability of the plough and particularly to preclude lateral sliding, the rearmost disc assembly, as shown in FIGS. 10 and 11, is replaced by double coulter assembly 80 that comprises a pair of coulters 81, 82 mounted in a spaced parallel array rigidly about an axle 83. The axle 83 is, in turn, secured to a vertical support shaft 84 at a predetermined angle as shown in FIG. 11. The support shaft 84 is carried by the plough beam 20 and attached to a sprocket 57 in a similar manner to the discs 53 except that the "jump stump" capability is not provided. In use, the coulter assembly is required to travel through about twice the angle that the discs rotate when the plough beam moves from the two operative positions and thus either the size of the sprocket can be changed or alternatively a gearbox 88 is provided to double the angular rotation of the coulter assembly. The coulters 81, 82 are designed such that the inboard coulter 81 is of much heavier section that the outboard coulter 82. The inboard coulter 81 is angled downwardly at about 20°–30° to the vertical to allow the coulter to drop into the end furrow (see FIG. 11). The outboard coulter 82 is comparatively sharp to allow the edge to cut into the unploughed surface. It has been found that this arrangement reduces the lateral sliding or slewing of the plough.

The assembly described above allows the plough beam 20 to be set at two operating angles acute to the forward direction of motion, namely, as shown in FIG. 2, a first position shown in full profile in which the plough beam 20 is at approximately 45° to the vertical, and a second position shown in dotted profile in which the plough beam is turned through 90° to be 45° to the vertical to the right-hand side. The movement of the disc assemblies 50 is between 70° to 95° as the plough beam 20 moves from the first to the second positions.

The rearmost double coulter 80 is however rotated through approximately 180°. Thus, for example, the plough beam may be set to a first position 45° to the left of the forward direction and the plough discs 52 rotated about their support shafts 51 so to be set at 10° to the right of the forward direction with their concave faces on the left-hand side. The plough would then be approximately set for conventional right-hand ploughing. It may readily be reversed in position by activating the hydraulic or pneumatic cylinder 65 to swing the plough beam 20 across to be set at 45° to the right of the forward direction with the shafts 51 carrying the discs 52 being rotated to set the plough discs 52 in the right-hand mode thereby turning the furrow slices to the right. Normally, two such left and right-hand ploughing positions would be preset so that a single control operation would cause the plough beam to swing to the desired position with the plough discs being automatically rotated on their shafts to their appropriate orientation.

While conventional plough discs are applicable to the plough described above, a novel form of mould board plough element has been developed for use with the reversible plough. As shown with particular reference to FIGS. 12 and 13, the plough has been adapted to replace the disc assemblies 50 with double mould board assemblies 100. Due to the size of the double mould board assemblies, every alternative disc assembly is replaced by a mould board assembly 100 that comprises a plough element 101 that is double ended with a conventional plough shear or blade 102, 103 defined at either end and a scallop 104 leading from the edge to form a mould board. The two scallops are on the same side of the plough element so that the plough element is symmetrical with respect to a vertical plane by setting it perpendicular to its longitudinal axis, i.e. its axis of travel. Travel in one direction causes the plough element to act as a conventional right-hand mould board plough; reversing the direction of travel 180° causes it to act as a left-hand mould board plough. The plough element is supported on a vertical shaft 105 that is secured to the plough beam 20 and terminates in a sprocket 57 in a similar manner to the disc assemblies. However, in this embodiment the "jump stump" capability is not required and thus shaft 105 is a direct running fit within the plough beam without the capacity for vertical displacement. The vertical shaft 105 is also provided with a transverse coulter support 108 that is rigidly secured to the shaft to extend both forwardly and rearwardly of the shaft 105 and to support a pair of coulters 109, 110 that are positioned just before the tip of the plough blades 103.

The double mould board assembly 102 as to be turned through an angle of between 140° and 150° depending on the position of the plough beam and thus the movement of the chain 79 driving the sprockets 157 is greater than would be the case where the chain drives the disc assemblies.

It is understood that the plough described above may be constructed so that a person with some mechanical expertise could adapt the plough to replace the disc assemblies with a double mould board assemblies thus providing the option of using the plough either as a reversible disc plough or as a reversible mould board plough. It is further understood that the plough described above is not restricted to many of the details described. In particular, the use of pneumatic or hydraulic cylinders to effect displacement of various components is only one form of effecting such displacement.

It is understood that other means such as hydraulic motors or the use of rack and pinions or other mechanical linkage assemblies well known to those skilled in this field could be adapted to effect the required motion. It is further understood that while in the preferred embodiment, a comparatively large plough is described utilizing front and rear bogey assembles the invention embraces a considerably smaller plough operating with no front bogey assembly but adapted to be directly coupled to the three point linkage of a tractor.

It is further understood that although separate cylinders are used to move the plough beam and rotate the plough elements a single drive means may be used synchronised to ensure the components move as required.

The claims defining the invention are as follows:

1. A plough apparatus comprising a wheeled support structure comprising arcuate end beams interconnected by longitudinally extending side beams; a plough beam mounted for pivotal movement about the center of the support structure with opposite ends of the plough beam being supported for movement along the arcuate end beams; a reinforcing cross beam extending across the side beams and through the plough beam while allowing pivotal movement of the plough beam; and a plurality of rotatable plough elements spaced along the plough beam; wherein the plough beam is adapted to pivot in a horizontal plane between a first beam position and a second beam position; and wherein each plough element is adapted to be rotated about a vertical axis between a first ploughing position corresponding with the first beam position and a second ploughing position corresponding with the second beam position.

2. A plough apparatus according to claim 1 wherein each arcuate end beam is positioned within end flanges on the respective end of the plough beam so that the plough beam is supported at each end for rotation about the centre of the support structure.

3. A plough apparatus according to claim 2, wherein each end flange of the plough beam supports a roller which resiliently engages the adjacent surface of the arcuate end beam.

4. A plough apparatus according to claim 2, wherein each end flange of the plough beam is a sliding fit on a bearing position between the end flange and the adjacent surface of the arcuate end beam.

5. A plough apparatus according to claim 1 wherein each plough element comprises a plough disc mounted on a shaft supported by the plough beam, said shaft being axially rotatable and capable of axial linear displacement relative to the plough beam.

6. A plough apparatus according to claim 5, wherein a chain driven sprocket is attached to one end of each shaft to effect axial rotation of the shaft whereby movement of the chain effects rotation of all the disc assemblies.

7. A plough apparatus according to claim 5 wherein the shaft of each plough element is capable of vertical displacement relative to the plough beam and wherein said apparatus further includes a spring positioned coaxially around the shaft and compressible between a collar on the shaft and the underside of the plough beam.

8. A plough apparatus according to claim 1 wherein each plough element comprises at least one mould board positioned on either side of a shaft mounted for axial rotation about the plough beam.

9. A plough apparatus according to claim 8 wherein a double coulter assembly is secured to the rear of the plough beam, the assembly comprising a vertical shaft secured to the plough beam to be axially rotatable thereto and a pair of disc shaped coulters mounted at opposite ends of a connecting shaft, the connecting shaft being secured to the vertical shaft with its longitudinal axis between 110° and 120° to the vertical.

10. A plough apparatus according to claim 1 wherein the support structure includes front and rear wheel assemblies, each wheel assembly comprising a pair of wheels interconnected by a steering arm so that the wheels are pivotable about a vertical axis to provide steering at both the front and rear of the plough apparatus.

11. A plough apparatus according to claim 10 wherein actuation means is provided to cause the front and rear wheels to pivot independently of one another relative to the support structure.

12. A plough apparatus according to claim 10 wherein each pair of wheels is supported about a cross beam with a vertical plane containing the axis of rotation of each wheel being spaced from the vertical pivot axis whereby the front wheels are mounted forwardly of the front cross beam and the rear wheels trail behind the rear cross beam.

13. A plough apparatus according to claim 12 wherein each cross beam is pivotally secured to the support structure and means is provided to adjust the angular relationship of the cross beam with the support structure whereby in one position the plough elements are lifted clear of the ploughing surface and in another position the plough elements are lowered relative to the wheel assemblies to engage the ploughing surface.

14. A plough apparatus according to claim 1 wherein actuation means is provided to cause the plough beam to pivot relative to the support structure between the beam positions.

15. A plough apparatus according to claim 14 wherein the actuation means comprises a hydraulic or pneumatic cylinder positioned between the plough beam and the support structure.

16. A plough apparatus according to claim 14 wherein further actuation means is provided to rotate each plough element about a vertical axis between the first ploughing and second ploughing positions.

* * * * *